(12) United States Patent
Vines et al.

(10) Patent No.: US 10,656,863 B1
(45) Date of Patent: May 19, 2020

(54) LIFECYCLE MANAGEMENT OF STORAGE CLUSTERS

(71) Applicant: Amazon Technologies, Inc., Seattle, WA (US)

(72) Inventors: Forrest MacKenzie Vines, Bonney Lake, WA (US); Avinash Nagasundaram, Bellevue, WA (US); Andrew Rinaldi, Seattle, WA (US); Nathan David Scott, Seattle, WA (US); Xingbang Tian, Seattle, WA (US); Jui Te Tseng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 306 days.

(21) Appl. No.: 15/343,083

(22) Filed: Nov. 3, 2016

(51) Int. Cl.
G06F 3/06 (2006.01)

(52) U.S. Cl.
CPC ............ *G06F 3/0649* (2013.01); *G06F 3/067* (2013.01); *G06F 3/0611* (2013.01); *G06F 3/0616* (2013.01); *G06F 3/0635* (2013.01); *G06F 3/0659* (2013.01)

(58) Field of Classification Search
CPC . G06F 11/1446–1469; G06F 17/30088; G06F 2201/84; G06F 3/0631; G06F 2009/45583; G06F 9/50–5094
See application file for complete search history.

(56) References Cited

U.S. PATENT DOCUMENTS

| | | | |
|---|---|---|---|
| 7,890,626 B1 | 2/2011 | Gadir | |
| 8,886,609 B2 | 11/2014 | Buragohain et al. | |
| 8,954,406 B2 | 2/2015 | Rodriguez et al. | |
| 9,002,842 B2 | 4/2015 | Ravid | |
| 2010/0312783 A1* | 12/2010 | Brady | G06F 17/30088 707/769 |
| 2011/0167221 A1* | 7/2011 | Pangal | G06F 11/1453 711/117 |
| 2011/0231580 A1* | 9/2011 | Nakamichi | G06F 3/0605 710/9 |
| 2013/0117286 A1* | 5/2013 | Gallant | G06F 7/24 707/752 |

(Continued)

OTHER PUBLICATIONS

David Linthicum, "Amazon's Redshift for big data analytics—the pros and cons," InfoWorld, Feb. 2013. Source: http://www.infoworld.com/article/2613700/big-data/amazon-s-redshift-for-big-data-analytics----the-pros-and-cons.html, pp. 1-3.

(Continued)

*Primary Examiner* — Nicholas J Simonetti
(74) *Attorney, Agent, or Firm* — Robert C. Kowert; Kowert, Hood, Munyon, Rankin & Goetzel, P.C.

(57) ABSTRACT

Methods, systems, and computer-readable media for lifecycle management of multiple storage clusters are disclosed. A first set of data is loaded into a first storage cluster. The first storage cluster is selected for loading the first set of data based at least in part on the first set of data and the first storage cluster being associated with a first period of time. The first storage cluster is placed into a read-only state. A second set of data is loaded into a second storage cluster. The second storage cluster is selected for loading the second set of data based at least in part on the second set of data and the second storage cluster being associated with a second period of time.

20 Claims, 8 Drawing Sheets

(56) References Cited

U.S. PATENT DOCUMENTS

| | | | |
|---|---|---|---|
| 2016/0004605 A1* | 1/2016 | Ahn | G06F 11/1469 |
| | | | 707/679 |
| 2016/0028648 A1* | 1/2016 | Wohlert | H04L 67/18 |
| | | | 709/226 |
| 2016/0170834 A1* | 6/2016 | Erickson | G06F 17/30321 |
| | | | 707/649 |
| 2016/0210175 A1* | 7/2016 | Morimura | G06F 9/45533 |
| 2017/0199770 A1* | 7/2017 | Peteva | G06F 9/5088 |

OTHER PUBLICATIONS

"Amazon Redshift: Management Guide," Amazon Web Services, Dec. 2012, Source: http://docs.aws.amazon.com/redshift/latest/mgmt/redshift-mgmt.pdf, pp. 1-263.

\* cited by examiner

LIFECYCLE MANAGEMENT OF STORAGE CLUSTERS

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogs of items offered for sale. For each item offered for sale, such electronic catalogs typically include at least one product detail page (e.g., a web page) that specifies various information about the item, such as a description of the item, one or more pictures of the item, as well as specifications (e.g., weight, dimensions, capabilities) of the item. Additionally, a marketplace may offer other types of pages to potential customers, such as a home page that introduces a customer to the marketplace and a search page that lists products relevant to one or more search terms. Interactions with marketplace customers may continuously generate large amounts of data that the merchant seeks to store.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for lifecycle management of storage clusters are described. Using the techniques described herein, clusters used for storage of time-segmented data may be transitioned through multiple stages of a lifecycle. For example, a cluster may be launched, initialized with appropriate software (and a configuration thereof) and a storage schema, made loadable with data for a length of time, made read-only to process queries for the previously loaded data, optimized to compact the read-only data or improve query performance, and finally terminated and snapshotted according to a data retention policy. A snapshot of a cluster may be maintained for potential restoration according to a snapshot retention policy. In one embodiment, a cluster may be associated with a particular period of time (e.g., a range from a starting time to an ending time), and data may be loaded into a particular cluster based (at least in part) on a correspondence between timestamps associated with the data and the period of time associated with the cluster. For example, different clusters may be associated with different 24-hour periods, and at least one new cluster may be automatically launched every 24 hours to store data associated with the upcoming day. Similarly, queries may be directed to particular clusters based (at least in part) on the ranges of time indicated in the queries and also on the clusters' time associations. Multiple clusters may exist at the same time but in different stages of their respective lifecycles. Multiple clusters may be loadable and/or queryable at a given time. By segmenting data across multiple clusters over time instead of using a single cluster, performance improvements may be achieved for both storing and querying data. Additionally, by increasing the granularity of the clusters, greater flexibility may be achieved for cluster management. For example, clusters may be launched with different storage capacities based (at least in part) on different anticipated storage needs for the different period of times associated with the clusters.

Figure 1:
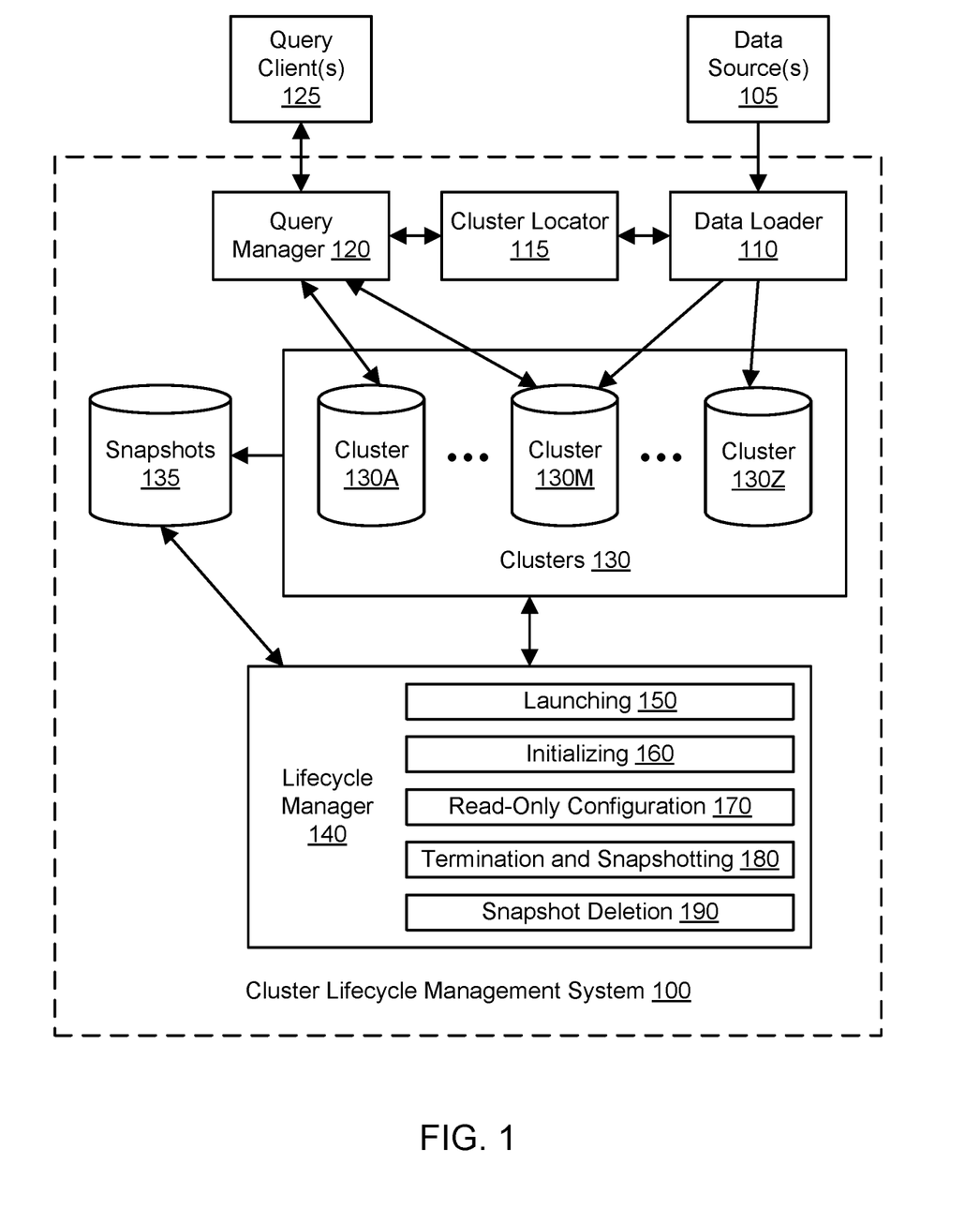
FIG. 1 illustrates an example system environment for lifecycle management of storage clusters, according to one embodiment.

FIG. 1 illustrates an example system environment for lifecycle management of storage clusters, according to one embodiment. A cluster lifecycle management system 100 may manage a set of clusters 130 such as clusters 130A through 130M through 130Z. Clusters may also be referred to herein as storage clusters. It is contemplated that any suitable number and configuration of clusters 130 may be managed by the cluster lifecycle management system 100. In one embodiment, other types of storage resources may be used instead of or in addition to clusters 130 with the cluster lifecycle management system 100. Clusters 130 may include any suitable storage resources implemented using any suitable storage technologies. For example, one of the clusters 130 may be implemented using a plurality of server computers, each of which may include or manage persistent storage resources. In one embodiment, a cluster may include only one server; typically, however, a cluster may include multiple servers that work in concert to manage a set of storage resources. One of the clusters 130 may transition through multiple stages of a lifecycle. For example, one of the clusters 130 may be launched, initialized with appropriate software and a storage schema, made loadable with data for a length of time, made read-only to process queries for the previously loaded data, optimized to compact the read-only data or improve query performance, and finally terminated and snapshotted after a period of time based (at least in part) on a data retention policy. Snapshots 135 of at least some of the clusters 130 may be maintained for periods of time based (at least in part) on a snapshot retention policy and may potentially be restored to active clusters.

The cluster lifecycle management system 100 may include various components or functionalities for interacting with clusters 130, such as a data loader 110, a cluster locator 115, a query manager 120, and a lifecycle manager 140. The data loader 110 may receive sets of data from one or more data sources 105 and may load the sets of data into loadable clusters 130. The data from the data source(s) may include a continuous or nearly continuous stream of data, such as resource updates, event logs, website logs, sensor data, and so on. For example, the data may include a stream of timestamped log entries associated with interactions between an online marketplace and its users, and a merchant that runs the online marketplace may seek to maintain these log entries in the clusters 130. Multiple clusters may be loadable with data at a given time. As shown in the example of FIG. 1, clusters 130M and 130Z may be loaded with data concurrently.

The query manager 120 may receive a query describing one or more aspects of data to be retrieved (e.g., a range of time associated with the data), process the query using an appropriate one or more of the clusters 130 to retrieve data responsive to the query, and return the retrieved data to a particular one of the query client(s) 125 that supplied the query. Multiple clusters may be queryable at a given time. As shown in the example of FIG. 1, clusters 130A and 130M may be queried concurrently. In some cases, a cluster such as cluster 130M may be both loadable with new data and queryable at a given time. In other cases, a cluster such as cluster 130Z may be loadable with new data but not queryable. In yet other cases, a cluster such as cluster 130A may be a read-only cluster that is queryable but not loadable with new data. In one embodiment, the query manager 120 may interact with a queueing service or subsystem in order to process queries in a first-in, first-out manner.

Elements of data from the data source(s) may be associated with timestamps or other indicators of time. In one embodiment, an individual one of the clusters 130 may be associated with a particular period of time (e.g., a range from a starting time to an ending time). Data may be loaded into a particular cluster based (at least in part) on a correspondence between the timestamps associated with the data and the period of time associated with the cluster. For example, different clusters may be associated with different 24-hour periods, and at least one new cluster may be automatically launched every 24 hours to store data associated with the upcoming day. Similarly, queries may be directed to particular clusters based (at least in part) on the ranges of time indicated in the queries and also on the clusters' time associations. Multiple clusters may exist at the same time but in different stages of their respective lifecycles. As shown in the example of FIG. 1, cluster 130Z may be the newest (e.g., most recently launched) cluster, cluster 130M may be an older cluster, and cluster 130A may be older than cluster 130M; additionally, one or more clusters predating cluster 130A may have been terminated and their contents transferred to the snapshots 135. In this manner, data that is associated with particular points in time may be segmented or partitioned across a set of clusters based on time.

The cluster locator 115 may select one or more of the clusters 130 to satisfy a request to load data and/or a request to query data. If the data loader 110 seeks to load a set of data onto a cluster, the cluster locator 115 may select one or more suitable clusters for storing the set of data based on any suitable criteria. For example, for loading data associated with a set of timestamps, the cluster locator 115 may select a cluster that is associated with a period of time that encompasses those timestamps. Similarly, if the query manager seeks to load a set of data onto a cluster, the cluster locator 115 may select one or more suitable clusters for storing the set of data based on any suitable criteria. For example, for querying data associated with a set of timestamps, the cluster locator 115 may select a cluster that is associated with a period of time that encompasses those timestamps. The cluster locator 115 may also use load-balancing criteria to select one or more clusters for loading and/or querying data. For example, if two different clusters have associated periods of time that include the timestamps of data to be loaded, then the cluster locator 115 may select the cluster with the lighter load (determined using suitable processor, memory, storage, and/or network metrics). For queries, the cluster locator 115 may prefer read-only clusters to writeable clusters to maximize performance of the clusters 130.

The lifecycle manager 140 may include various components or functionalities such as a cluster launching component 150, a cluster initializing component 160, a read-only configuration component 170, a termination and snapshotting component 180, and a snapshot deletion component 190. In one embodiment, the various components 150-190 may correspond to various stages (or sub-stages) of a typical cluster lifecycle. The cluster launching component 150 may perform or initiate any tasks needed to launch a cluster. Launching a cluster may include provisioning any computing resources and/or storage resources to be used in the cluster, e.g., from a pool of available resources. In one embodiment, different clusters may be launched with different hardware configurations and/or software configurations. The specific configuration for a cluster may be determined on any suitable basis, including machine learning techniques, default configurations, and/or instructions from an administrator (or other user with sufficient privileges) associated with a client of the cluster lifecycle management system 100. For example, a cluster may be launched with a greater storage capacity than usual based (at least in part) on machine learning and/or manual observation that anticipates an unusually busy day for the client, e.g., "Cyber Monday" for an online merchant whose marketplace generates logs to be stored in the clusters 130. Similarly, some clusters may be launched with different access privileges or security configurations than others. Launching a cluster may include sending a CreateCluster request from the lifecycle manager 140 to a cluster subsystem such as Amazon® Redshift, receiving a response to the CreateCluster request, and, while the status is not "available," sending a DescribeClusters request and receive an appropriate response.

The launching component 150 may include or interact with a scheduler. In one embodiment, a cluster may be launched according to a schedule, and the schedule may be configurable by an administrator (or other user with sufficient privileges) associated with a client of the cluster lifecycle management system 100. For example, if each cluster is intended to represent daily data associated with a particular 24-hour period, then a cluster may be launched at a suitable time before the 24-hour period begins. In one embodiment, a cluster may be automatically launched based (at least in part) on the arrival of the associated period of time, potentially with a buffer period (e.g., two hours) in advance of the period of time. In one embodiment, a cluster may be automatically launched based (at least in part) on anticipation of the associated period of time beginning, e.g., prior to the window of time opening. Clusters may also be launched not according to a schedule but to replace clusters that have failed or otherwise been taken offline prematurely. In this manner, the cluster lifecycle management system 100 may implement an efficient scheme for fault tolerance that may avoid the expense and performance penalty of modifying an existing cluster to add nodes.

The cluster initializing component 160 may perform or initiate any tasks needed to place a launched cluster into a loadable state, e.g., a state in which data from the data source(s) 105 may be stored in the cluster by the data loader 110. The loadable state may also be referred to as a writeable state. The cluster initialization may include any bootstrapping operations, installing and/or configuring operating system software, installing and/or configuring storage management software, installing and/or configuring one or more database schemas or table schemas for storing data, and so on. The schema(s) may be provided by an administrator (or other user with sufficient privileges) associated with a client of the cluster lifecycle management system 100. Initializing or bootstrapping a cluster may include sending a Create Groups request from the lifecycle manager 140 to a cluster subsystem such as Amazon® Redshift, receiving the status of the Create Groups request, sending a Create Users request and receiving the status, sending a Create Tables request and receiving the status, adding stored procedures and/or other logical entities to the cluster, adding static data to the cluster, and so on, until the cluster is in a loadable state. Once the cluster is in a loadable state, the data loader 110 may potentially select the cluster for storage of newly received data and cause the data to be stored in the cluster (if selected), potentially including transforming the data according to a relevant schema. The data may be loaded into a database, table, or other suitable data structure and stored persistently in the storage resource(s) associated with the cluster.

The read-only configuration component 170 may place a cluster into a read-only state. In the read-only state, new data from the data source(s) 105 may not be added to the cluster by the data loader 110, but the cluster may be used for query processing by the query manager 120. In one embodiment, placing a cluster in the read-only state may include adding or modifying one or more tags associated with the cluster in a subsystem that maintains the clusters, such as Amazon® Redshift. The tags may represent alphanumeric labels representing lifecycle stages (or sub-stages) such as "launching," "loadable" or "writeable," "read-only," "terminating," and so on, in addition to tags potentially indicating the cluster name, owner, and/or associated period of time. The read-only configuration component 170 may also perform analysis and/or optimization of a read-only cluster, e.g., to compact the stored data for improved use of storage resources, build one or more indexes to improve query performance, and so on. The analysis and/or optimization may be performed in the read-only state and not in the loadable state to improve the performance of loading data into the cluster. In various embodiments, a cluster may be automatically placed in a read-only state based (at least in part) on a schedule or on automated application of a policy.

In one embodiment, a cluster may be automatically placed in a read-only state after a particular duration of time has passed since the cluster was launched or made loadable. In one embodiment, a cluster may be automatically placed in a read-only state after the period of time associated with the cluster has elapsed, potentially after a configurable buffer period (e.g., two hours) at the end of the original period of time. In one embodiment, a cluster storing an active stream of data may be automatically placed in a read-only state only after a newer cluster has been launched, initialized, and made loadable. In one embodiment, a cluster may be automatically placed in a read-only state if consumption of its storage resources has passed a threshold, e.g., such that the cluster is full or nearly full. In one embodiment, a cluster may be automatically placed in a read-only state based (at least in part) on performance metrics for one or more of the clusters, e.g., if the query volume for the particular cluster has exceeded a threshold.

The lifecycle manager 140 may observe a data retention policy for maintaining data in the clusters 130. The termination and snapshotting component 180 may remove data from the clusters 130 based (at least in part) on the data retention policy and place the data in another storage subsystem, e.g., for longer-term (and often less expensive) storage. To do so for a particular cluster, the termination and snapshotting component 180 may generate a point-in-time copy of the storage resources of the cluster, including any previously loaded (and potentially optimized) data from the data sources 105, and store the copy as a snapshot. The termination and snapshotting component 180 may also terminate the computing resources and/or storage resources of the cluster, potentially returning them to a pool of available resources. The data retention policy may include a data retention period, e.g., one week. The data retention policy (and associated data retention period) may vary from client to client and/or from cluster to cluster, and manual exceptions may be made (e.g., by an administrator of the system 100) to keep data in the clusters 130 beyond the typical retention period and/or remove data from the clusters before the typical retention period expires. The manual exceptions to keep clusters in the read-only state may be implemented using tags that indicate a "do not terminate" status. In one embodiment, the data retention policy may prioritize keeping clusters that have been most recently and/or most frequently accessed while deprioritizing clusters that have been least recently and/or least frequently accessed. In one embodiment, the data retention policy may keep or terminate clusters based (at least in part) on a maximum number of clusters or nodes allowable for a client in the cluster subsystem, such as Amazon® Redshift.

A snapshot may potentially be restored to a newly launched cluster in order to retrieve its contents. In one embodiment, at least some of the snapshots 135 may be maintained indefinitely, e.g., by tagging them appropriately. In one embodiment, the snapshots 135 may expire over time and be deleted using the snapshot deletion component 190 based (at least in part) on a snapshot retention policy. The snapshot retention policy may include a snapshot retention period, e.g., one month. The snapshot retention policy (and associated snapshot retention period) may vary from client to client and/or from snapshot to snapshot, and manual exceptions may be made (e.g., by an administrator of the system 100) to keep snapshots beyond their typical retention period and/or delete snapshots before their typical retention period expires. In one embodiment, the snapshot retention policy may prioritize keeping snapshots that have been most recently and/or most frequently accessed while deprioritizing snapshots that have been least recently and/or least frequently accessed.

Using these automated techniques for lifecycle management of clusters, numerous benefits may be achieved. For example, administration may be simplified by reducing the number and frequency of manual tasks to be performed by administrators. By segmenting data across multiple clusters over time instead of using a single cluster, performance improvements may be achieved for both storing and querying data. Additionally, the time and expense of repartitioning and shuffling data across a single cluster may be avoided. Furthermore, the use of multiple smaller clusters may yield improved reliability and scalability in comparison to one large cluster. However, hardware costs may be the same or lower for multiple clusters than for the corresponding large cluster. The performance of clusters may also be improved by limiting maintenance activities such as analysis and optimization to read-only clusters. By increasing the granularity of the clusters, greater flexibility may be achieved for cluster management, potentially including cluster-specific transitioning between different lifecycle stages and/or dynamic scaling based on anticipated traffic.

Figure 7:
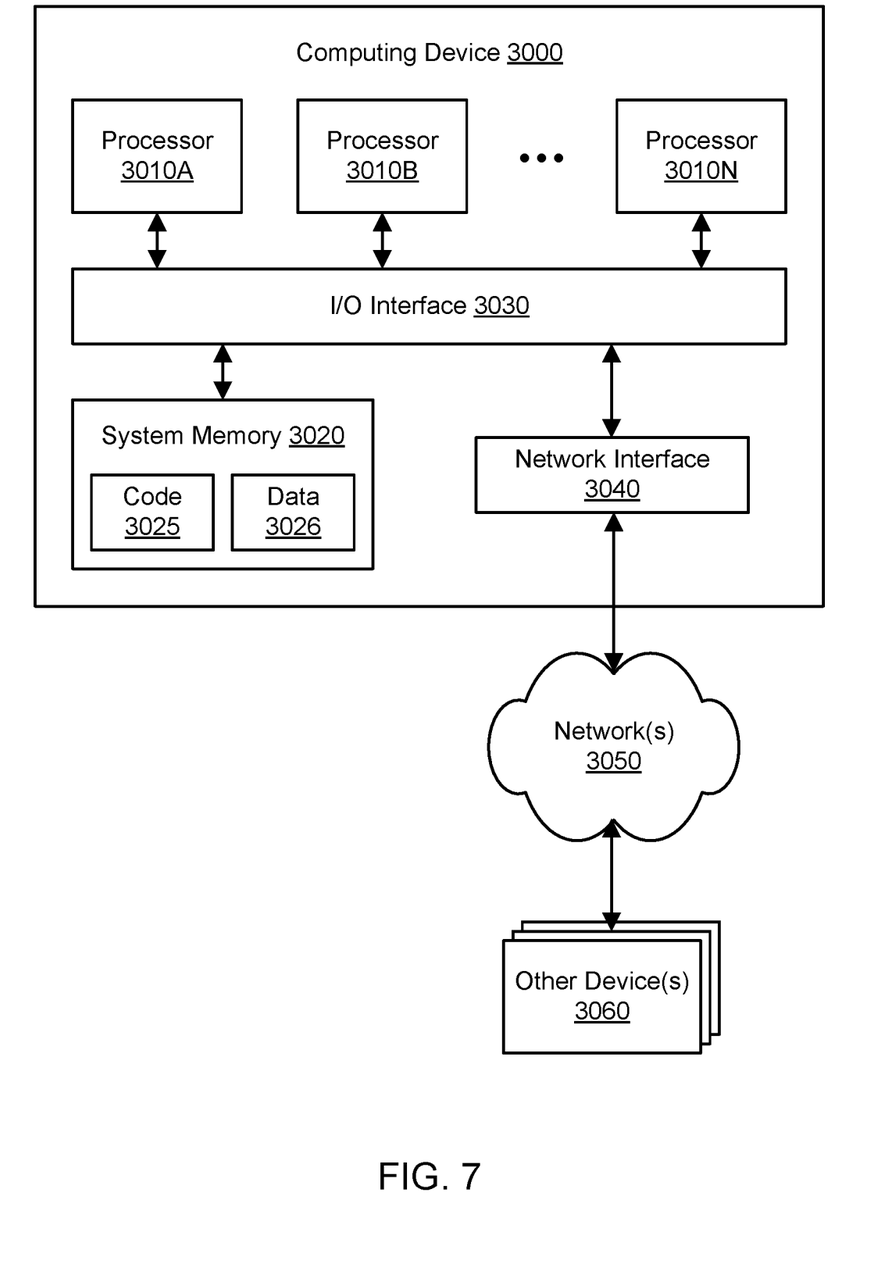
FIG. 7 illustrates an example computing device that may be used in some embodiments.

The cluster lifecycle management system 100 may be implemented using any suitable number and configuration of computing devices, any of which may be implemented by the example computing device 3000 illustrated in FIG. 7. The computing devices may be located in any suitable number of data centers or geographical locations. In various embodiments, the functionality of the different components of the cluster lifecycle management system 100 may be provided by the same computing device or by different computing devices. If any of the components of the cluster lifecycle management system 100 are implemented using different computing devices, then the components and their respective computing devices may be communicatively coupled, e.g., via one or more networks. Each of the components of the cluster lifecycle management system 100 may represent any combination of software and hardware usable to perform their respective functions, as discussed as follows. Operations implemented by the cluster lifecycle management system 100 may be performed automatically, e.g., without a need for user initiation or user intervention after an initial configuration stage, and programmatically, e.g., by execution of program instructions on at least one computing device. It is contemplated that the cluster lifecycle management system 100 may include additional components not shown, fewer components than shown, or different combinations, configurations, or quantities of the components shown.

The cluster lifecycle management system 100 may be implemented in a service-oriented system in which multiple services (such as the lifecycle manager 140, query manager 120, data loader 110, and so on) collaborate according to a service-oriented architecture. In such an environment, the lifecycle manager 140 may offer its functionality as service to multiple clients. In one embodiment, each client may provide one or more streams of data to be loaded into a series of clusters that may be automatically launched based on a configuration supplied by a client. Similarly, query clients 125 may query particular sets of clusters if they supply appropriate access permissions. It is contemplated that any suitable number and configuration of clients may interact with the cluster lifecycle management system 100. To enable clients to invoke their functionality, the components of the cluster lifecycle management system 100 may expose any suitable interface(s), such as one or more APIs or other programmatic interfaces and/or graphical user interfaces (GUIs). A service of the cluster lifecycle management system 100 may be implemented as a plurality of different instances that are distributed throughout one or more networks, and each instance may offer access (e.g., read access) the functionality of the corresponding service to various clients. The functionality of the service in the cluster lifecycle management system 100 may be offered to the clients in exchange for fees.

One or more of the clients may represent external devices, systems, or entities with respect to any services or components of the cluster lifecycle management system 100. The client devices, such as query clients 125, may be implemented using any suitable number and configuration of computing devices, any of which may be implemented by the example computing device 3000 illustrated in FIG. 7. Clients may convey network-based service requests to the cluster lifecycle management system 100 via one or more networks. In various embodiments, the network(s) may encompass any suitable combination of networking hardware and protocols necessary to establish network-based communications between client devices and the cluster lifecycle management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the cluster lifecycle management system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the cluster lifecycle management system 100. It is noted that in some embodiments, client devices may communicate with the cluster lifecycle management system 100 using a private network rather than the public Internet.

In one embodiment, aspects of the cluster lifecycle management system 100 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Because resources of the provider network may be under the control of multiple clients (or tenants) simultaneously, the provider network may be said to offer multi-tenancy and may be termed a multi-tenant provider network. For example, different ones of the clusters 130 may be concurrently used for the storing of data by different clients and/or for the querying of data by different query clients 125.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
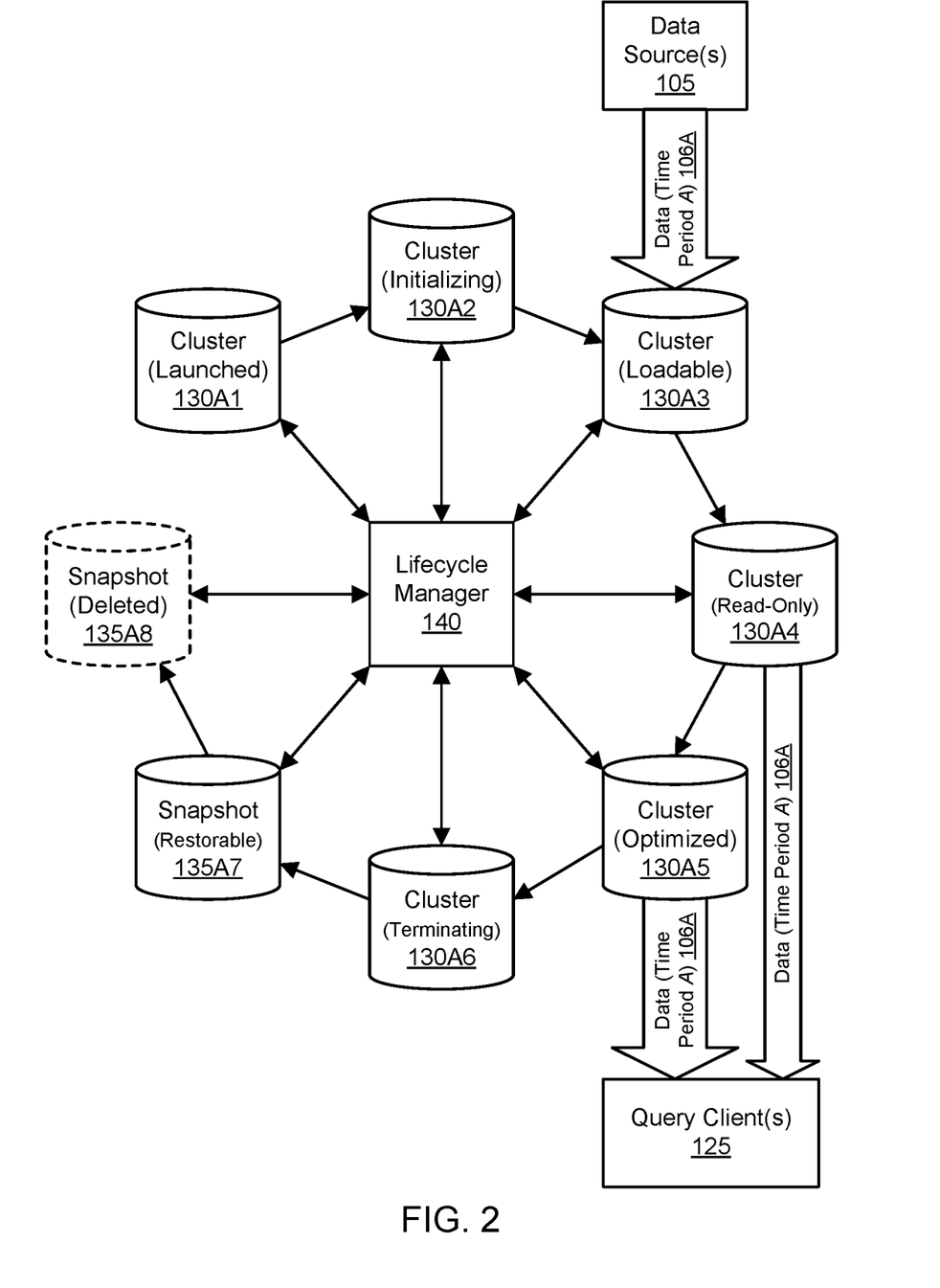
FIG. 2 illustrates an example lifecycle of a storage cluster, according to one embodiment.

FIG. 2 illustrates an example lifecycle of a storage cluster, according to one embodiment. As discussed above, the lifecycle manager 140 may transition a cluster through various stages of a lifecycle. In various embodiments, the lifecycle of a cluster may include various combinations of stages (and potentially sub-stages). Not every cluster may transition through the stages shown in the example of FIG. 2; some clusters may go through fewer stages than shown and/or additional stages not shown. In a first stage of the lifecycle, a cluster may be in a launched stage 130A1. When the cluster is being initialized to make it loadable, the cluster may be in an initializing stage 130A2. The cluster may be associated with a particular time period A upon launch or initialization, and the association between the cluster and the time period may be maintained in any suitable component (e.g., the cluster locator 115). Upon being made loadable, the cluster may be in a loadable stage 130A3 and may be loaded with data 106A associated with the time period A, e.g., with individual elements of data or sets of data having timestamps within the time period A. In one embodiment, elements of previously loaded data 106A may be queried while the cluster is in the loadable stage 130A3. At some point, typically after the end of the time period A, the cluster may be made read-only and placed in the read-only stage 130A4. The cluster may be analyzed and optimized, e.g., to improve the use of storage resources and/or the performance of queries. In the read-only stage 130A4 and optimized stage 130A5, elements of the previously loaded data 106A may be queried. In one embodiment, the cluster may be placed into a terminating stage 130A6, often according to a data retention policy. The previously loaded data 106A may be copied to a snapshot 135A7. The snapshot 135A7 may be restorable (e.g., to an active cluster) until it is deleted, often according to a snapshot retention policy, as represented by the deleted stage 135A8.

Figure 3:
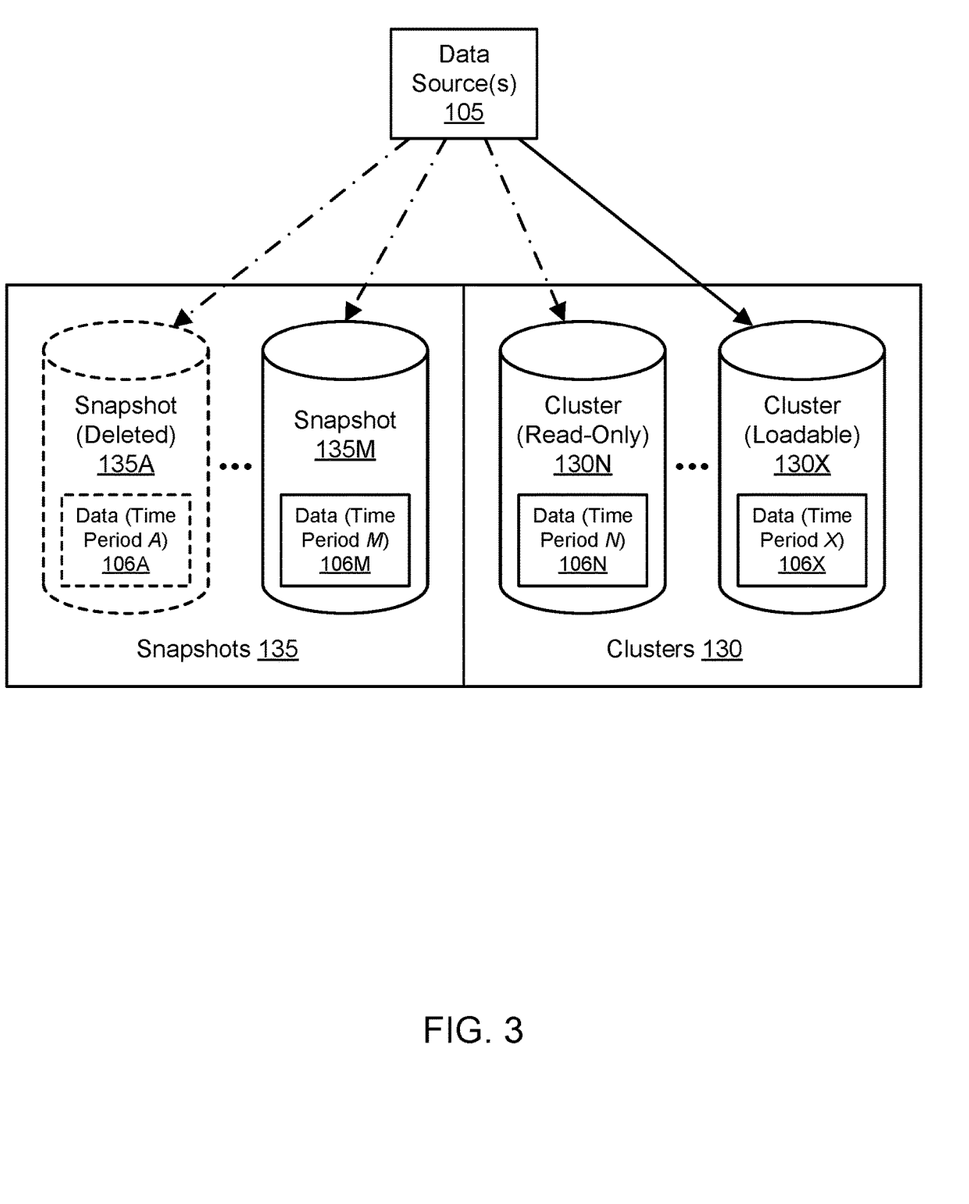
FIG. 3 illustrates an example of data segmentation across storage clusters based (at least in part) on timestamps associated with the data, according to one embodiment.

FIG. 3 illustrates an example of data segmentation across storage clusters based (at least in part) on timestamps associated with the data, according to one embodiment. Timestamped data from one or more data sources 105 may be stored in a set of clusters 130N-130X and snapshots 135A-135M. In one embodiment, the set of clusters 130N-130X and snapshots 135A-135M may be associated with a particular data stream and/or a particular geographical region or division of a business entity; it is contemplated that the clusters 130 and snapshots 135 may correspond to multiple such streams, regions, or divisions at any given time. Each of the clusters 130N-130X and snapshots 135A-135M (and the terminated clusters corresponding to those snapshots) may be associated with a particular time period; the time periods may overlap or instead be disjoint. In one embodiment, multiple clusters may be launched for a particular time period for redundancy, or time periods may overlap for redundancy.

The example of FIG. 3 shows the segmentation of data over a set of storage entities at a particular point in time. The oldest data 106A, from the earliest time period A, was previously stored in snapshot 135A, which has been deleted. Data 106M, from a more recent time period M, was previously stored in a cluster and is now maintained in a snapshot 135M representing the contents of that terminated cluster. Data 106N, from an even more recent time period N, is currently maintained in a read-only cluster 130N. The most current data 106X, from a current (or most recent) time period X, is currently stored in a loadable cluster 130X. As long as the cluster 130X is still loadable, additional data 106X may be loaded into the cluster 130X. It is also contemplated that a cluster may be active with data representing a time period between A and M, e.g., if a snapshot has been restored to a cluster or if clusters have different retention policies.

Figure 4A:
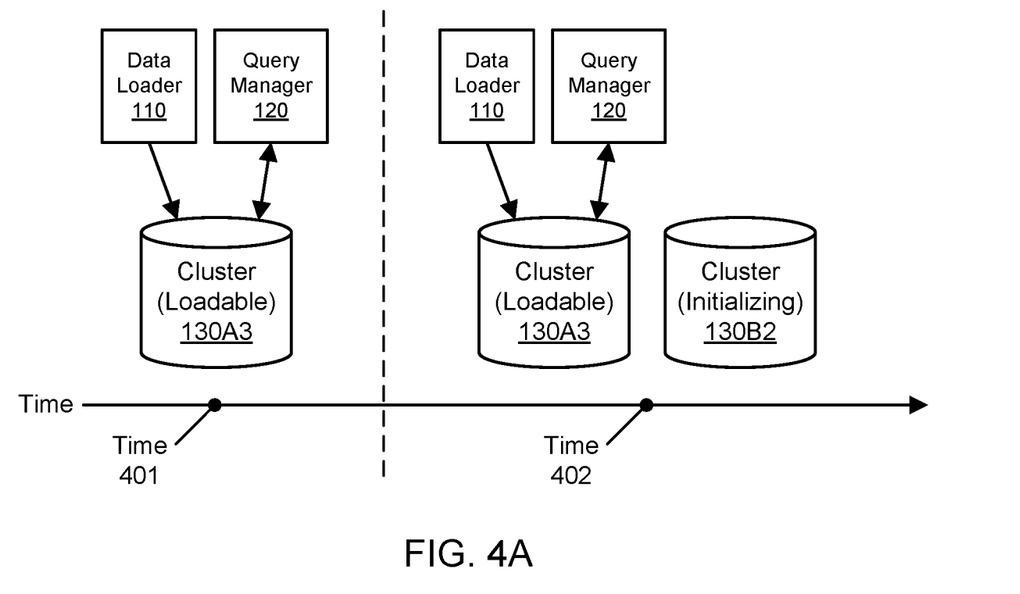
FIG. 4A through FIG. 4D illustrate an example of lifecycle management of a set of storage clusters over time, according to one embodiment.
Figure 4B:
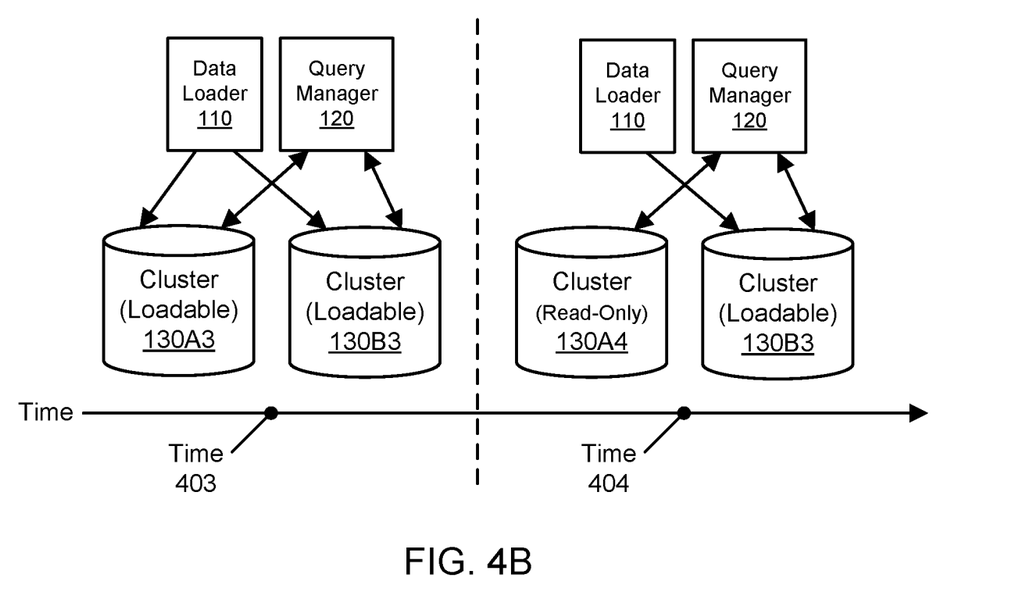

FIG. 4A through FIG. 4D illustrate an example of lifecycle management of a set of storage clusters over time, according to one embodiment. As shown in FIG. 4A, time 401 on a timeline represents a first point in time with respect to a set of clusters corresponding to a particular data stream, region, and/or division of an organization. At time 401, only a first cluster 130A3 exists, and it is both loadable and queryable. At a later point in time, time 402, the first cluster 130A3 is still active and both loadable and queryable. However, a new cluster 130B2 has been launched and is currently in an initializing state. As such, the second cluster 130B2 is neither loadable nor queryable at time 402. As shown in FIG. 4B, time 403 represents a yet later point in time. At time 403, the first cluster 130A3 is still loadable and queryable; meanwhile, the second cluster 130B3 is also active and both loadable and queryable. At the further time 404, the first cluster 130A4 has been transitioned to a read-only state where it is queryable but not loadable; meanwhile, the second cluster 130B3 is both loadable and queryable.

Figure 4C:
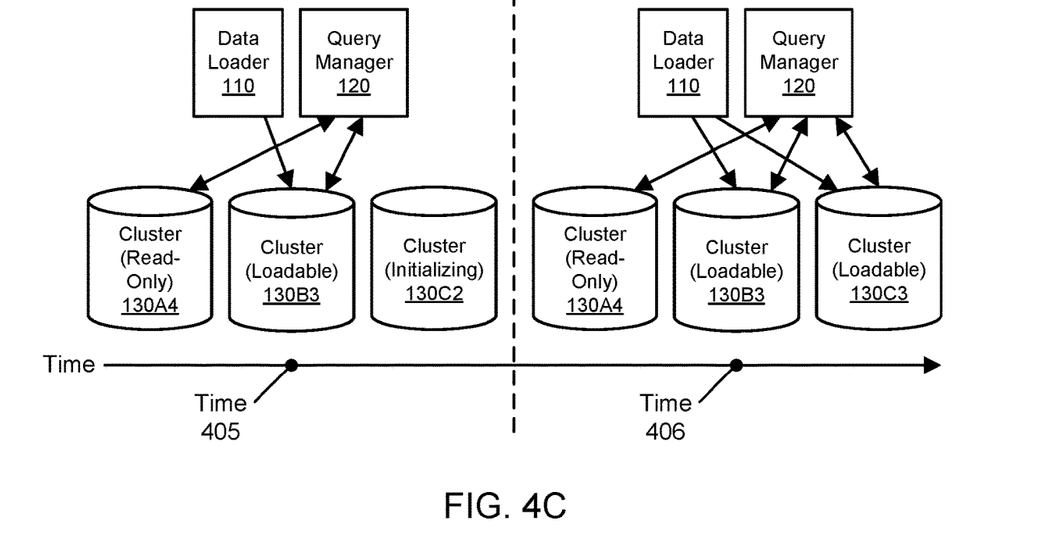
Figure 4D:
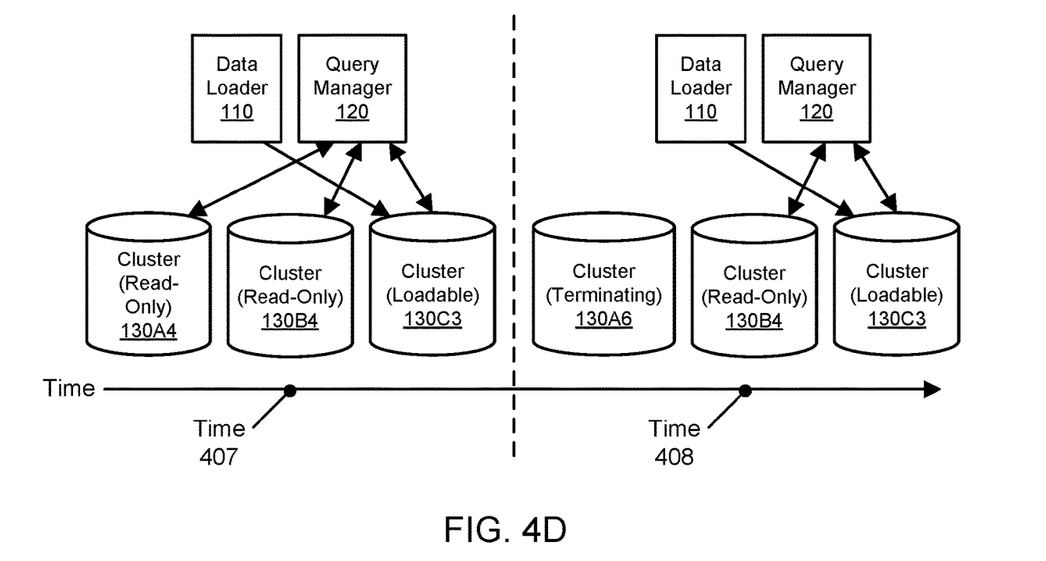

As shown in FIG. 4C, at time 405, a third cluster 130C2 has been launched and is currently in an initializing state. By time 406, the third cluster 130C3 has reached a loadable state and can be loaded with data or queried. At the same point in time, the second cluster 130B3 is also loadable and queryable, but the first cluster 130A4 is read-only. As shown in FIG. 4D, at time 407, the second cluster 130B4 has joined the first cluster 130A4 in being read-only, thus leaving the third cluster 130C3 as the only loadable cluster for this data stream. By time 408, the first cluster 130A6 is terminating as preparation for being snapshotted and is no longer queryable.

Figure 5:
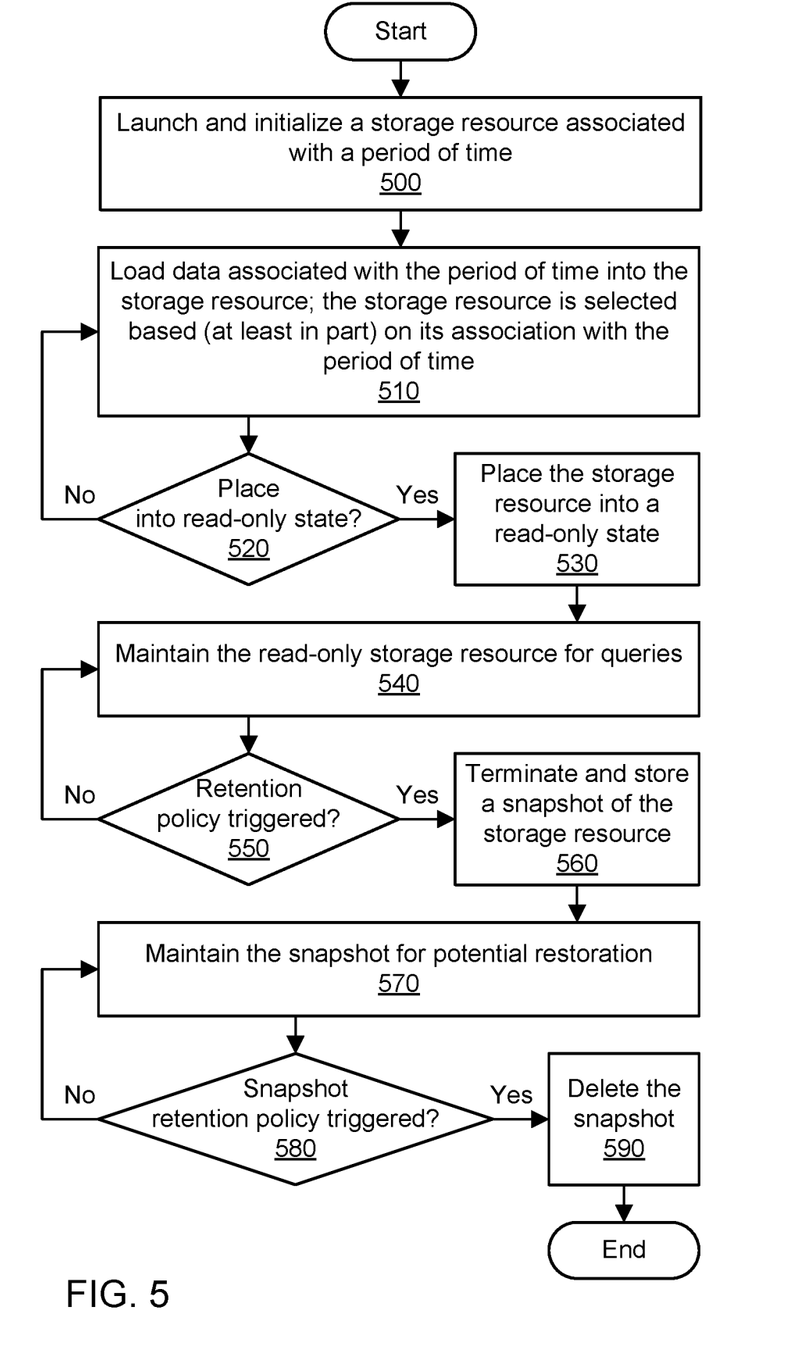
FIG. 5 is a flowchart illustrating a method for lifecycle management of a storage cluster, according to one embodiment.

FIG. 5 is a flowchart illustrating a method for lifecycle management of a storage cluster, according to one embodiment. As shown in 500, a storage resource such as a storage cluster may be launched and initialized. The storage resource may be associated with a particular period of time, e.g., a particular day of the week or a range of time from a beginning time to an ending time. The association between the storage resource and the period of time may be maintained in any suitable manner, such as by a cluster locator component 115 and/or using tags to label the cluster in a cluster subsystem. The storage resource may be launched using an automated scheduler, e.g., based (at least in part) on arrival of or anticipation of the period of time.

As shown in 510, data associated with the period of time may be loaded into the storage resource. The storage resource may be selected for storing the data (e.g., by the cluster locator 115) based on least in part on a correspondence between timestamps in the data and the association of the storage resource and the range of time, e.g., if the range of time includes the timestamps. As shown in 520, it may be determined whether the storage resource should be placed into a read-only state. If so, then as shown in 530, the storage resource may be placed into a read-only state. Any suitable basis may be used for determining whether to place the storage resource into the read-only state, e.g., if the period of time associated with the storage resource (and potentially with a buffer period afterwards) has expired, if a newer storage resource has become loadable, and so on.

As shown in 540, the storage resource may be maintained in the read-only state and potentially used to process queries. In one embodiment, the storage resource may be subjected to various maintenance tasks while read-only, such as analysis and/or storage optimization. The storage resource may be subject to automated enforcement of a data retention policy that may include a data retention period. As shown in 550, it may be determined whether the data retention period has passed for the storage resource or whether the resource should be terminated and snapshotted any other considerations relevant to triggering a data retention policy. If so, then as shown in 560, a snapshot of the contents of the storage resource may be generated and stored in an appropriate storage subsystem, and the storage resource may be terminated.

As shown in 570, the snapshot may be maintained for a time for potential restoration to an active storage resource (e.g., a cluster). The snapshot may be subject to automated enforcement of a snapshot retention policy that may include a snapshot retention period. As shown in 580, it may be determined whether the snapshot retention period has passed for the snapshot or whether the snapshot should be deleted under any other considerations relevant to triggering a snapshot retention policy. If so, then as shown in 590, the snapshot may be deleted and may no longer be considered restorable or recoverable.

Figure 6:
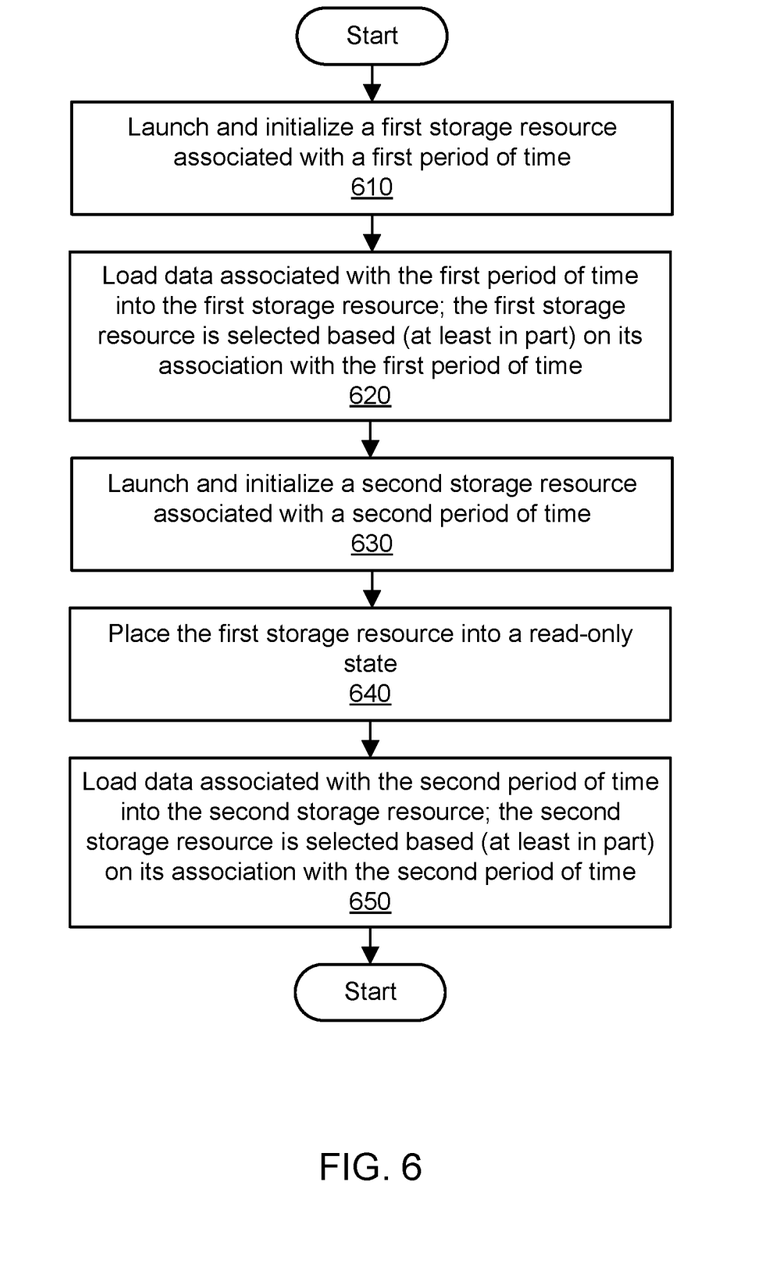
FIG. 6 is a flowchart illustrating a method for lifecycle management of multiple storage clusters, according to one embodiment.

FIG. 6 is a flowchart illustrating a method for lifecycle management of multiple storage clusters, according to one embodiment. As shown in 610, a first storage resource such as a storage cluster may be launched. The first storage resource may be launched based (at least in part) on arrival of or anticipation of a first period of time. An association between the first storage resource and the first period of time may be stored. As shown in 620, a first set of data may be loaded from a data source into the first storage resource. The first set of data may both be associated with the first period of time, e.g., via timestamps for the first set or for its individual elements. The first storage resource may be selected for loading the first set of data based (at least in part) on the first set of data and the first storage resource being associated with the first period of time.

As shown in 630, a second storage resource (again, such as a storage cluster) may be launched. The second storage resource may be launched based (at least in part) on arrival of or anticipation of a second period of time following the first period of time. An association between the second storage resource and the second period of time may be stored.

At some point, e.g., after the first period of time and during the second period of time, the first storage resource may be placed into a read-only state, as shown in 640. The first storage resource may be placed into the read-only state based (at least in part) on the first period of time having elapsed and/or on the second storage resource being loadable. In another embodiment, the operation shown in 640 may be performed before the operation shown in 630. As shown in 650, a second set of data may be loaded (from the same data source or a different data source) into the second storage resource. The second set of data may both be associated with the second period of time, e.g., via timestamps for the second set or for its individual elements. The second storage resource may be selected for loading the second set of data based (at least in part) on the second set of data and the second storage resource being associated with the second period of time.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a cluster lifecycle management system, wherein the cluster lifecycle management system is configured to:
launch a first storage cluster based at least in part on a schedule, the first storage cluster comprising two or more storage instances to store data from a data source and process queries directed to the data;
load a first set of data from the data source into the first storage cluster, wherein the first set of data and the first storage cluster are associated with a first period of time, and wherein the first storage cluster is selected for loading the first set of data based at least in part on the first set of data and the first storage cluster being associated with the first period of time;
launch a second storage cluster based at least in part on the schedule, the second storage cluster comprising two or more storage instances to store data from the data source and process queries directed to the data;
place the first storage cluster into a read-only state after the first set of data is loaded into the first storage cluster; and
load a second set of data from the data source into the second storage cluster, wherein the second set of data and the second storage cluster are associated with a second period of time, and wherein the second storage cluster is selected for loading the second set of data based at least in part on the second set of data and the second storage cluster being associated with the second period of time.

2. The system as recited in claim 1, wherein the cluster lifecycle management system is further configured to:
receive a query indicating a time range;
select the first storage cluster or the second storage cluster for the query based at least in part on matching the time range indicated in the query to the first period of time associated with the first storage cluster or the second period of time associated with the second storage cluster; and
retrieve, from the first storage cluster or the second storage cluster selected for the query, one or more elements of data responsive to the query.

3. The system as recited in claim 1, wherein the cluster lifecycle management system is further configured to:
based at least in part automated enforcement of a data retention policy, terminate the first storage cluster in the read-only state and store a snapshot of the first storage cluster.

4. The system as recited in claim 1, wherein the second storage cluster is launched with a different storage capacity than the first storage cluster based at least in part on a different anticipated storage requirement for the second period of time than for the first period of time.

5. A computer-implemented method, comprising:
performing, by one or more computing devices that implement a storage lifecycle management system:
loading a first set of data from a data source into a first storage resource that comprises two or more storage instances, the first storage resource to process queries directed to the first set of data, wherein the first set of data and the first storage resource are associated with a first period of time, and wherein the first storage resource is selected for loading the first set of data based at least in part on the first set of data and the first storage resource being associated with the first period of time;
placing the first storage resource into a read-only state after the first set of data is loaded into the first storage resource; and
loading a second set of data from the data sources into a second storage resource that comprises two or more storage instances, the second storage resource to process queries directed to the second set of data, wherein the second set of data and the second storage resource are associated with a second period of time, and wherein the second storage resource is selected for loading the second set of data based at least in part on the second set of data and the second storage resource being associated with the second period of time.

6. The method as recited in claim 5, further comprising:
receiving a query indicating a time range;
selecting the first storage resource or the second storage resource for the query based at least in part on matching the time range indicated in the query to the first period of time associated with the first storage resource or the second period of time associated with the second storage resource; and
retrieving, from the first storage resource or the second storage resource selected for the query, one or more elements of data responsive to the query.

7. The method as recited in claim 5, further comprising:
performing storage optimization on the first storage resource after the first set of data is loaded into the first storage resource.

8. The method as recited in claim 5, further comprising:
based at least in part automated enforcement of a data retention policy, terminating the first storage resource in the read-only state and storing a snapshot of the first storage resource.

9. The method as recited in claim 8, further comprising:
restoring the snapshot of the first storage resource to a newly launched storage resource.

10. The method as recited in claim 8, further comprising:
based at least in part automated enforcement of a snapshot retention policy, deleting the snapshot of the first storage resource.

11. The method as recited in claim 5, wherein the second storage resource is launched with a different storage capacity than the first storage resource based at least in part on a different anticipated storage requirement for the second period of time than for the first period of time.

12. The method as recited in claim 5, further comprising:
launching the first storage resource using an automated scheduler based at least in part on the first period of time; and
launching the second storage resource using the automated scheduler based at least in part on the second period of time.

13. The method as recited in claim 5, wherein the first period of time overlaps with the second period of time.

14. The method as recited in claim 5, wherein at least a portion of the second set of data is loaded into the second storage resource before the first storage resource is placed into the read-only state.

15. A computer-readable storage medium storing program instructions computer-executable to perform:
loading a first set of data into a first storage cluster that comprises two or more storage instances, the first storage cluster to process queries directed to the first set of data, wherein the first set of data and the first storage cluster are associated with a first period of time, and wherein the first storage cluster is selected for loading the first set of data based at least in part on the first set of data and the first storage cluster being associated with the first period of time;

placing the first storage cluster into a read-only state after the first period of time has elapsed; and loading a second set of data into a second storage cluster that comprises two or more storage instances, the second storage cluster to process queries directed to the second set of data, wherein the second set of data and the second storage cluster are associated with a second period of time, and wherein the second storage cluster is selected for loading the second set of data based at least in part on the second set of data and the second storage cluster being associated with the second period of time.

16. The computer-readable storage medium as recited in claim 15, wherein the program instructions are further computer-executable to perform:

receiving a query indicating a time range;

selecting the first storage cluster or the second storage cluster for the query based at least in part on matching the time range indicated in the query to the first period of time associated with the first storage cluster or the second period of time associated with the second storage cluster; and retrieving, from the first storage cluster or the second storage cluster selected for the query, one or more elements of data responsive to the query.

17. The computer-readable storage medium as recited in claim 16, wherein the first storage cluster is selected for the query based at least in part on the first storage cluster being in the read-only state and the second storage cluster not being in the read-only state.

18. The computer-readable storage medium as recited in claim 15, wherein the program instructions are further computer-executable to perform:

based at least in part automated enforcement of a data retention policy, terminating the first storage cluster in the read-only state and storing a snapshot of the first storage cluster.

19. The computer-readable storage medium as recited in claim 15, wherein the second storage cluster is launched with a different storage capacity than the first storage cluster based at least in part on a different anticipated storage requirement for the second period of time than for the first period of time.

20. The computer-readable storage medium as recited in claim 15, wherein the program instructions are further computer-executable to perform:

launching the first storage cluster using an automated scheduler based at least in part on arrival of or anticipation of the first period of time; and launching the second storage cluster using the automated scheduler based at least in part on arrival of or anticipation of the second period of time.

* * * * *